US011875730B2

(12) United States Patent
Han

(10) Patent No.: US 11,875,730 B2
(45) Date of Patent: Jan. 16, 2024

(54) DISPLAY APPARATUS AND DRIVING METHOD THEREOF

(71) Applicant: LG DISPLAY CO., LTD., Seoul (KR)

(72) Inventor: Kwang Hee Han, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/947,286

(22) Filed: Sep. 19, 2022

(65) Prior Publication Data

US 2023/0215336 A1 Jul. 6, 2023

(30) Foreign Application Priority Data

Dec. 30, 2021 (KR) ........................ 10-2021-0193371

(51) Int. Cl.

*G09G 3/20* (2006.01)
*G09G 3/3233* (2016.01)
*G09G 3/3266* (2016.01)

(52) U.S. Cl.

CPC ......... *G09G 3/2096* (2013.01); *G09G 3/3233* (2013.01); *G09G 3/3266* (2013.01); *G09G 2300/0819* (2013.01); *G09G 2300/0842* (2013.01); *G09G 2310/0286* (2013.01); *G09G 2310/0294* (2013.01); *G09G 2310/08* (2013.01); *G09G 2330/021* (2013.01)

(58) Field of Classification Search

None

See application file for complete search history.

(56) References Cited

U.S. PATENT DOCUMENTS

2020/0273409 A1 * 8/2020 Hsieh .................. G09G 3/3266

* cited by examiner

*Primary Examiner* — Christopher J Kohlman
(74) *Attorney, Agent, or Firm* — POLSINELLI PC

(57) ABSTRACT

A display apparatus includes a display panel including a sub-display area including an opening and a main display area including no opening, a gate driver supplying a gate signal to the display panel, and a driver controlling the gate driver, wherein the driver separates a sub-clock signal for controlling the sub-display area and a main clock signal for controlling the main display area and varies a pulse width of the sub-clock signal.

18 Claims, 12 Drawing Sheets

DISPLAY APPARATUS AND DRIVING METHOD THEREOF

CROSS-REFERENCE TO RELATED APPLICATION

This application claims the benefit of the Korean Patent Application No. 10-2021-0193371 filed on Dec. 30, 2021, which is hereby incorporated by reference in its entirety.

BACKGROUND

Field of the Disclosure

The present disclosure relates to a display apparatus and a driving method thereof.

Description of the Background

As information technology advances, the market for display apparatuses which are connection mediums connecting a user to information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which supplies power to the display panel or the driver.

In such display apparatuses, when the driving signal (for example, a gate signal and a data signal) is supplied to each of the subpixels provided in the display panel, a selected subpixel may transmit light or may self-emit light, and thus, an image may be displayed. However, in the above described display apparatuses, a problem of luminance non-uniformity caused by a load difference of a gate driver can occur.

SUMMARY

To overcome the aforementioned problem, the present disclosure is to provide a display apparatus and a driving method thereof, in which a problem of luminance non-uniformity caused by a load difference of a gate driver may be solved in forming an opening (a hole or a notch) of a display area of a display panel.

To achieve these and other advantages and in accordance with the present disclosure, as embodied and broadly described herein, a display apparatus includes: a display panel including a sub-display area including an opening and a main display area including no opening; a gate driver supplying a gate signal to the display panel; and a driver controlling the gate driver, wherein the driver separates a sub-clock signal for controlling the sub-display area and a main clock signal for controlling the main display area and varies a pulse width of the sub-clock signal.

The driver may vary the pulse width of the sub-clock signal, for compensating for a luminance difference caused by a shape of the opening.

The driver may gradually vary the pulse width of the sub-clock signal in a predetermined section, on the basis of the shape of the opening.

A sampling time of each of subpixels disposed in the sub-display area may vary by at least one horizontal line units, on the basis of a variation of the pulse width of the sub-clock signal.

A pulse width of a scan signal applied to subpixels disposed in the sub-display area may vary based on the pulse width of the sub-clock signal.

The pulse width of the sub-clock signal may be narrower than a pulse width of the main clock signal.

In another aspect of the present disclosure, a display apparatus includes: a display panel including a sub-display area including an opening and a main display area including no opening; a gate driver supplying a gate signal to the display panel; and a driver controlling the gate driver, wherein a sampling time of each of subpixels disposed in the sub-display area varies by at least one horizontal line units.

The driver may separate a sub-clock signal for controlling the sub-display area and a main clock signal for controlling the main display area and may vary a pulse width of the sub-clock signal so that the sampling time of each of the subpixels disposed in the sub-display area varies by at least one horizontal line units.

The driver may gradually vary the pulse width of the sub-clock signal in a predetermined section, on the basis of a shape of the opening.

The subpixels disposed in the sub-display area may have a data voltage charging rate which varies by at least one horizontal line units.

In another aspect of the present disclosure, a driving method of a display apparatus, including a display panel including a sub-display area including an opening and a main display area including no opening, a gate driver supplying a gate signal to the display panel, and a driver controlling the gate driver, includes: applying a sub-clock signal for controlling the sub-display area to a sub shift register; applying a main clock signal for controlling the main display area to a main shift register; and applying a scan signal, generated based on the sub-clock signal and the main clock signal, to a display panel and sampling a data voltage, wherein the applying of the sub-clock signal to the sub shift register includes gradually varying the pulse width of the sub-clock signal in a predetermined section, on the basis of a shape of the opening.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings.

DETAILED DESCRIPTION

Hereinafter, the present disclosure will be described more fully with reference to the accompanying drawings, in which exemplary aspects of the disclosure are shown. The disclosure may, however, be embodied in many different forms and should not be construed as being limited to the aspects set forth herein; rather, these aspects are provided so that this disclosure will be thorough and complete, and will fully convey the concept of the disclosure to those skilled in the art.

A display apparatus according to the present disclosure may be applied to televisions (TVs), video players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, or a liquid crystal display (LCD) apparatus. Hereinafter, however, for convenience of description, a light emitting display apparatus self-emitting light on the basis of an inorganic light emitting diode or an organic light emitting diode will be described for example.

Figure 1:
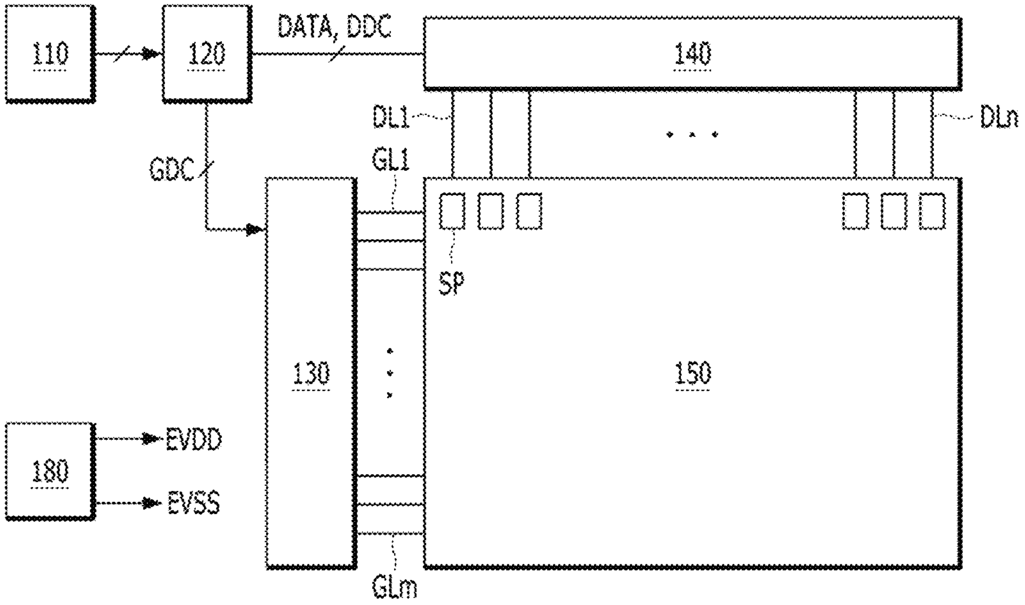
FIG. 1 is a block diagram schematically illustrating a light emitting display apparatus.
Figure 2:
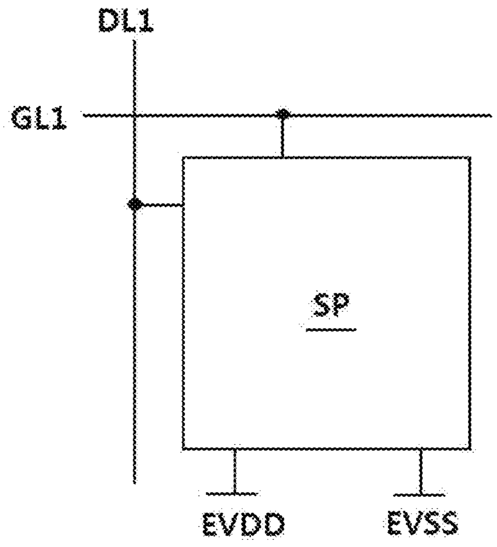
FIG. 2 is a block diagram schematically illustrating a subpixel illustrated in FIG. 1.

FIG. 1 is a block diagram schematically illustrating a light emitting display apparatus, and FIG. 2 is a block diagram schematically illustrating a subpixel illustrated in FIG. 1.

As illustrated in FIGS. 1 and 2, the light emitting display apparatus may include a video supply unit 110, a timing controller 120, a gate driver 130, a data driver 140, a display panel 150, and a power supply unit 180.

The video supply unit 110 (or a set or a host system) may output a video data signal supplied from the outside or a video data signal and various driving signals stored in an internal memory thereof. The video supply unit 110 may supply a data signal and the various driving signals to the timing controller 120.

The timing controller 120 may output a gate timing control signal GDC for controlling an operation timing of the gate driver 130, a data timing control signal DDC for controlling an operation timing of the data driver 140, and various synchronization signals (for example, a vertical synchronization signal Vsync and a horizontal synchronization signal Hsync). The timing controller 120 may provide the data driver 140 with the data timing control signal DDC and a data signal DATA supplied from the video supply unit 110. The timing controller 120 may be implemented as an integrated circuit (IC) type and may be mounted on a printed circuit board (PCB), but is not limited thereto.

The gate driver 130 may output a gate signal (or a gate voltage) in response to the gate timing control signal GDC supplied from the timing controller 120. The gate driver 130 may supply the gate signal to a plurality of subpixels, included in the display panel 150, through a plurality of gate lines GL1 to GLm. The gate driver 130 may be implemented as an IC type or may be directly provided on the display panel 150 in a gate-in panel (GIP) type, but is not limited thereto.

In response to the data timing control signal DDC supplied from the timing controller 120, the data driver 140 may sample and latch the data signal DATA, convert a digital data signal into an analog data voltage on the basis of a gamma reference voltage, and output the analog data voltage. The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply unit 180 may generate a high level voltage and a low level voltage on the basis of an external input voltage supplied from the outside and may respectively output the high level voltage and the low level voltage through a first power line EVDD and a second power line EVSS. The power supply unit 180 may generate a voltage (for example, a gate voltage including a gate high voltage and a gate low voltage) needed for driving of the gate driver 130 or a voltage (for example, a drain voltage and a half drain voltage) needed for driving of the data driver 140, in addition to the high level voltage and the low level voltage.

The display panel 150 may display an image on the basis of a driving signal including the gate signal and a data voltage and a driving voltage including the high level voltage and the low level voltage. The subpixels of the display panel 150 may each self-emit light. The display panel 150 may be manufactured based on a substrate, having stiffness or flexibility, such as glass, silicon, or polyimide. Also, the subpixels emitting light may include pixels including red, green, and blue, or may include pixels including red, green, blue, and white.

For example, one subpixel SP may be connected to a first data line DL1, a first gate line GL1, the first power line EVDD, and the second power line EVSS and may include a pixel circuit which includes a switching transistor, a driving transistor, a storage capacitor, and an organic light emitting diode. The subpixel SP applied to the light emitting display apparatus may self-emit light, and thus, may be complicated in circuit configuration. Also, the subpixel SP may further include various circuits such as a compensation circuit which compensates for a degradation in the organic light emitting diode emitting light and a degradation in the driving transistor supplying a driving current to the organic light emitting diode. Accordingly, it may be assumed that the subpixel SP is simply illustrated in a block form.

Hereinabove, each of the timing controller 120, the gate driver 130, and the data driver 140 has been described as an individual element. However, based on an implementation type of the light emitting display apparatus, one or more of the timing controller 120, the gate driver 130, and the data driver 140 may be integrated into one IC.

Figure 3:
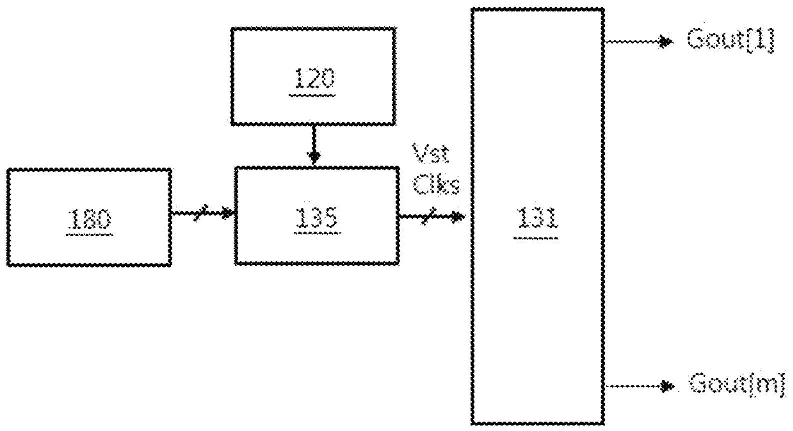
FIGS. 3 and 4 are diagrams for describing a configuration of a gate driver of a gate-in panel (GIP) type.
Figure 4:
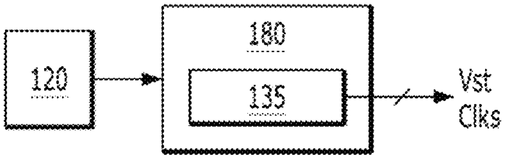
Figure 5:
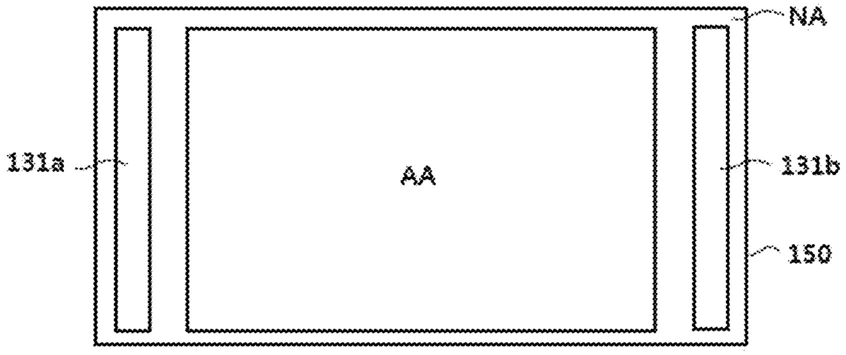
FIG. 5 is a diagram illustrating an arrangement example of the gate driver of the GIP type.
Figure 6:
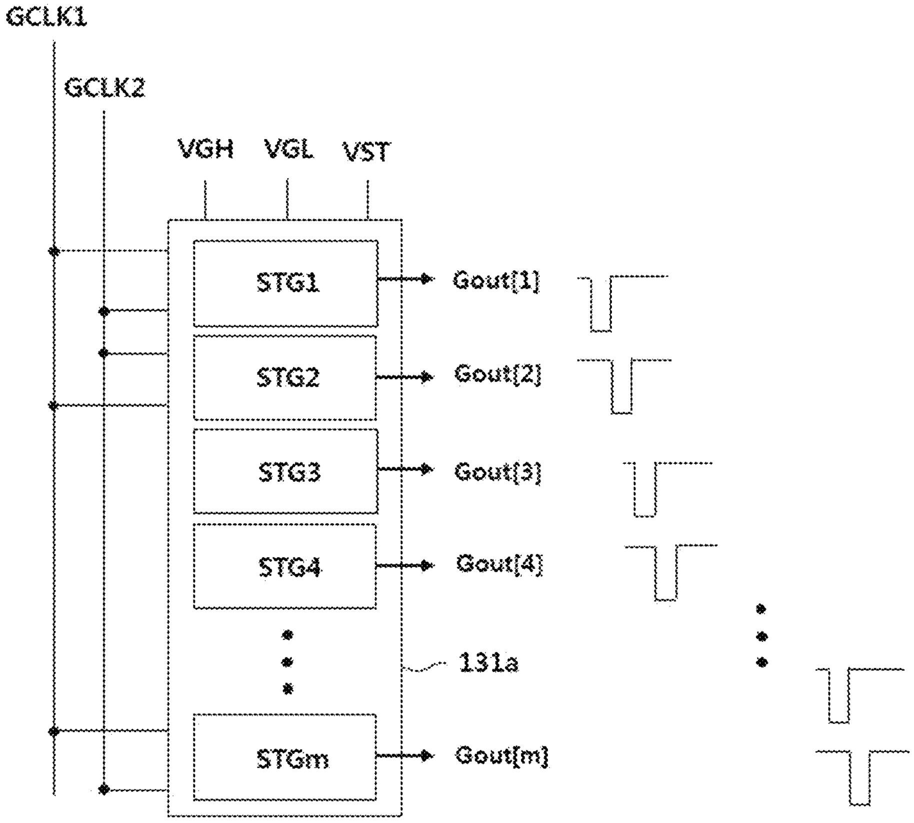
FIG. 6 is a diagram illustrating a shift register disposed at one side of a display panel.

FIGS. 3 and 4 are diagrams for describing a configuration of a gate driver of a GIP type, FIG. 5 is a diagram illustrating an arrangement example of the gate driver of the GIP type, and FIG. 6 is a diagram illustrating a shift register disposed at one side of a display panel.

As illustrated in FIG. 3, a GIP type gate driver 130 may include a shift register 131 and a level shifter 135. The level shifter 135 may generate clock signals Clks and a start signal Vst on the basis of signals and voltages output from a timing controller 120 and a power supply unit 180. The clock signals Clks may be generated in a J-phase form (where J is an integer of 2 or more) where phases such as two phases, four phases, or eight phases differ.

As illustrated in FIGS. 3 and 4, unlike the shift register 131, the level shifter 135 may be independently implemented as an IC type or may be included in the power supply unit 180. However, this may be merely an aspect, and the present disclosure is not limited thereto.

As illustrated in FIG. 5, a plurality of shift registers 131*a* and 131*b* outputting gate signals in a GIP type gate driver may be disposed in a non-display area NA of a display panel 150. The shift registers 131*a* and 131*b* may be implemented as a thin film type on the display panel 150 on the basis of the GIP type. An example where the shift registers 131*a* and 131*b* are disposed in left and right non-display areas NA of the display panel 150 is illustrated, but the present disclosure is not limited thereto.

As illustrated in FIG. 6, a shift register 131*a* may be connected to a gate high voltage line VGH, a gate low voltage line VGL, a start signal line VST, a first clock signal line GCLK1, and a second clock signal line GCLK2.

The shifter register 131*a* may include first to $M^{th}$ stages STG1 to STGm, and the first to $M^{th}$ stages STG1 to STGm may have a dependent connection relationship for sequentially outputting signals. The first to $M^{th}$ stages STG1 to STGm may operate based on a voltage and signals supplied through the gate high voltage line VGH, the gate low voltage line VGL, the start signal line VST, the first clock signal line GCLK1, and the second clock signal line GCLK2 and may output gate signals Gout[1] to Gout[m]. The gate signals Gout[1] to Gout[m] may be output in a voltage form (for example, a low voltage form illustrated in FIG. 6) for turning on/off transistors provided in a display panel.

Hereinafter, in the present disclosure, for convenience of description, an example where a timing controller and a data driver are implemented as one integrated driver will be described, but the timing controller and the data driver may be divided as described above with reference to FIG. 1.

Figure 7:
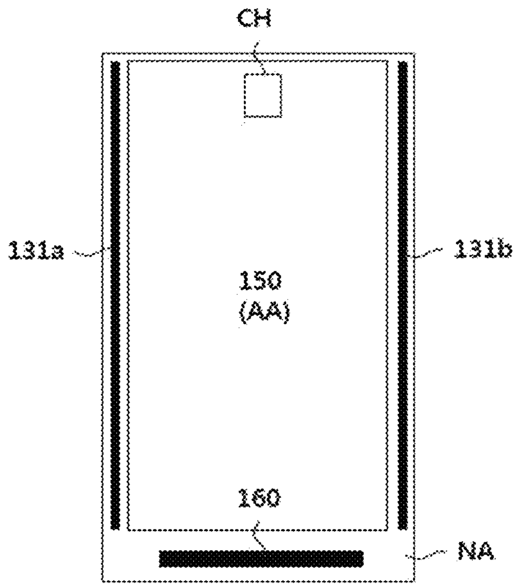
FIG. 7 is a diagram illustrating a light emitting display apparatus according to a first aspect of the present disclosure.
Figure 8:
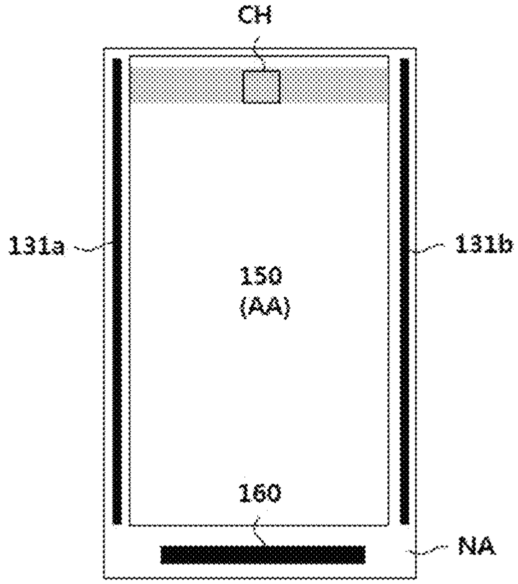
FIG. 8 is a diagram for describing details considered in the light emitting display apparatus according to the first aspect of the present disclosure.
Figure 9:
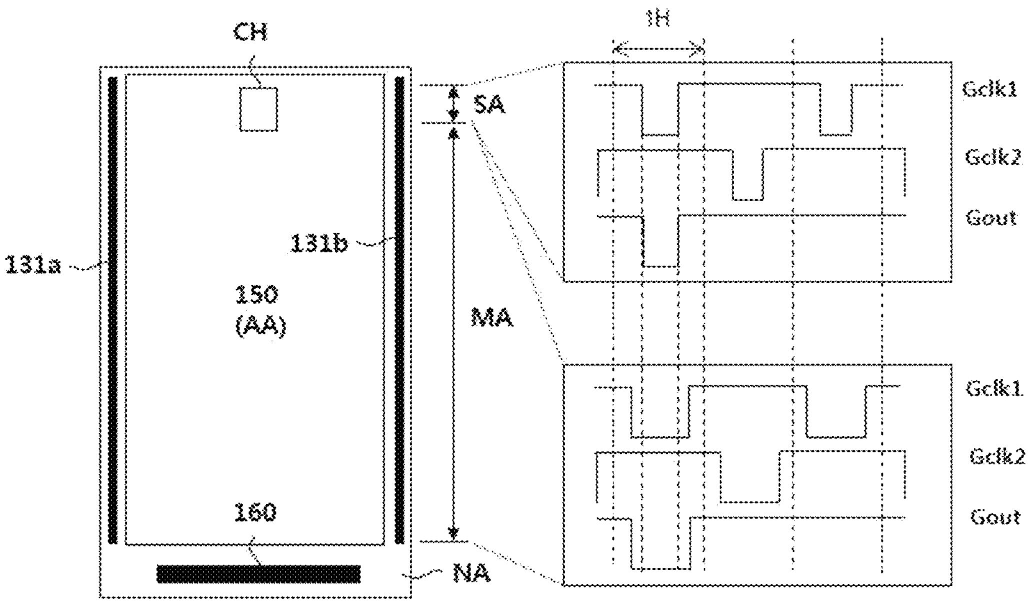
FIG. 9 is a diagram for describing a clock signal applying method in the light emitting display apparatus according to the first aspect of the present disclosure.

FIG. 7 is a diagram illustrating a light emitting display apparatus according to a first aspect of the present disclosure, FIG. 8 is a diagram for describing details considered in the light emitting display apparatus according to the first aspect of the present disclosure, and FIG. 9 is a diagram for describing a clock signal applying method in the light emitting display apparatus according to the first aspect of the present disclosure.

As illustrated in FIG. 7, a driver 160 may be disposed in one (lower) non-display area NA of the display panel 150. The driver 160 may be a device where the timing controller and the data driver described above with reference to FIG. 1 are integrated as one body. A first shift register 131*a* and a second shift register 131*b* may be disposed in left and right non-display areas NA of the display panel 150.

The display panel 150 may include an opening CH which is referred to as a notch or a hole, so that an optical device such as a camera is embedded into a display area AA. The opening CH may be provided at one side (an upper portion) of the display panel 150. An optical device such as a camera may be exposed at the outside through the opening CH, but may be protected by a cover substrate (a glass substrate).

As illustrated in FIG. 8, when an opening CH is disposed in a display area AA, a luminance difference with other lines where the opening CH is provided may occur. For example, lines included in a region where the opening CH is provided may have luminance which is lower than lines included in a region where the opening CH is not provided. Such a luminance difference may be caused by a length difference between gate lines transferring a gate signal and a load difference (or a signal difference) caused thereby. Accordingly, in a case where the opening CH is formed in the display area AA of the display panel 150, it may be required to solve such a problem.

As illustrated in FIG. 9, in the first aspect of the present disclosure, a display area AA may be divided into a main display area MA and a sub-display area SA, and by changing a first clock signal Gclk1 and a second clock signal Gclk2 applied to the areas, a problem occurring in FIG. 8 may be solved. Here, the main display area MA may be an area where the opening CH is not provided, and the sub-display area SA may be an area where the opening CH is provided.

For example, a pulse width of the first clock signal Gclk1 and a pulse width of the second clock signal Gclk2 applied to the sub-display area SA may be narrower than a pulse width of the first clock signal Gclk1 and a pulse width of the second clock signal Gclk2 applied to the main display area MA. On the other hand, a pulse width of the first clock signal Gclk1 and a pulse width of the second clock signal Gclk2 applied to the sub-display area SA may be wider than a pulse width of the first clock signal Gclk1 and a pulse width of the second clock signal Gclk2 applied to the main display area MA.

A variation form (or gate clock on/off time variation) of a pulse width of the first clock signal Gclk1 and a pulse width of the second clock signal Gclk2 may be selected based on an electrical characteristic of a subpixel implemented in the display area AA of the display panel 150. For example, when a transistor of a subpixel implemented in the display area AA is a p type which is turned on by a low voltage, a pulse width of the first clock signal Gclk1 and a pulse width of the second clock signal Gclk2 applied to the sub-display area SA may be narrower than a pulse width of the first clock signal Gclk1 and a pulse width of the second clock signal Gclk2 applied to the main display area MA as in FIG. 9. On the other hand, when the transistor of the subpixel implemented in the display area AA is an n type which is turned off by a low voltage, a pulse width of the first clock signal Gclk1 and a pulse width of the second clock signal Gclk2 applied to the sub-display area SA may be widened.

As described above, when a pulse width of the first clock signal Gclk1 and a pulse width of the second clock signal Gclk2 applied to the sub-display area SA vary, a dim horizontal luminance difference (luminance non-uniformity) caused by a load difference may be reduced. However, a variation form of a signal shown in FIG. 9 may be applied to a case where the opening CH has a tetragonal shape, but may be difficult to be applied to a case where the opening CH has a circular shape. Accordingly, the following second aspect is proposed.

Figure 10:
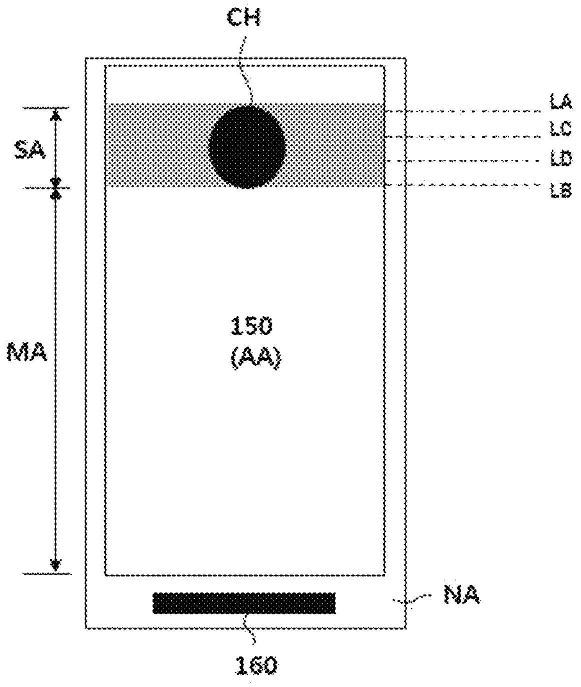
FIG. 10 is a diagram illustrating a light emitting display apparatus according to a second aspect of the present disclosure.
Figure 11:
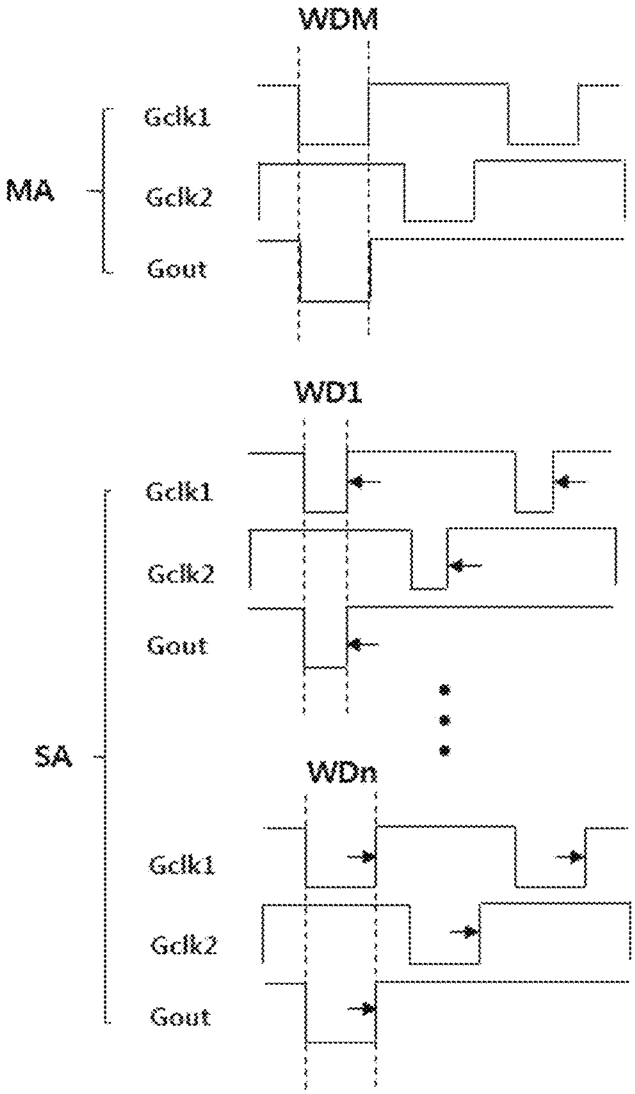
FIGS. 11 and 12 are diagrams for describing a clock signal applying method according to the second aspect of the present disclosure.
Figure 12:
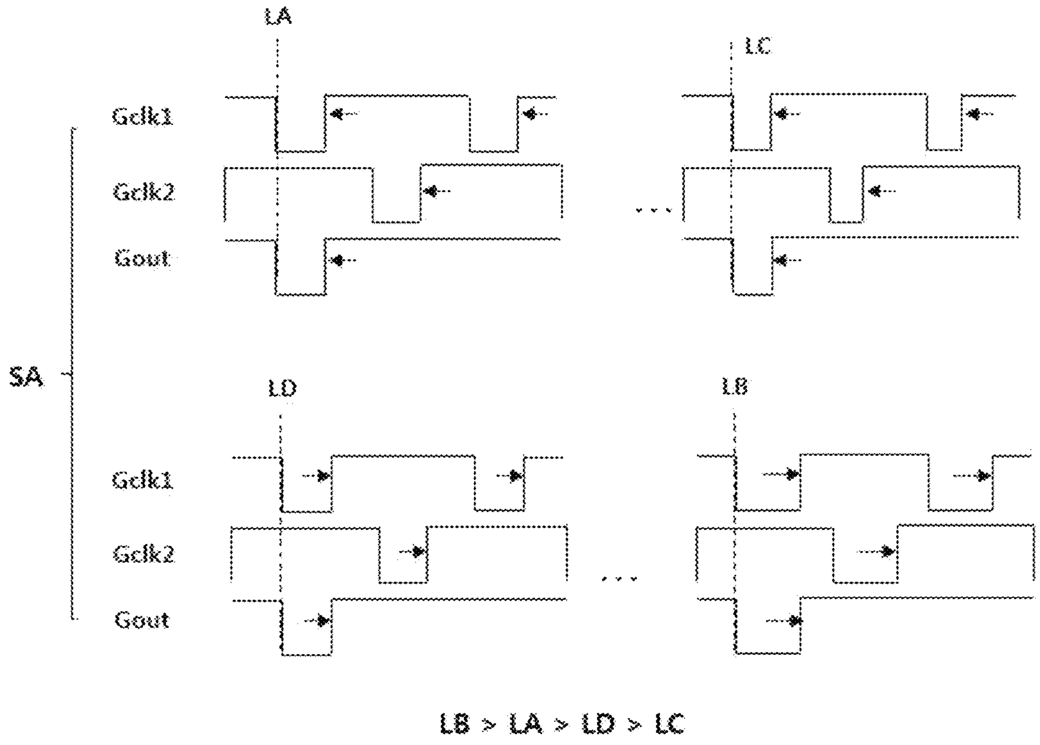

FIG. 10 is a diagram illustrating a light emitting display apparatus according to a second aspect of the present disclosure, and FIGS. 11 and 12 are diagrams for describing a clock signal applying method according to the second aspect of the present disclosure.

As illustrated in FIG. 10, a display panel 150 may include an opening CH having a circular shape in a sub-display area SA. The opening CH may be a region which is referred to as a hole or a notch, for embedding an optical device such as a camera into a display area AA.

A pulse width WDM of each of the first clock signal Gclk1 and the second clock signal Gclk2 applied to the main display area MA may not vary and a pulse width of each of the first clock signal Gclk1 and the second clock signal Gclk2 applied to the sub-display area SA may vary, and thus, the second aspect of the present disclosure may be applied to a case where the opening CH has a tetragonal shape, a circular shape, or a polygonal shape.

To this end, a pulse width of each of the first clock signal Gclk1 and the second clock signal Gclk2 applied to the sub-display area SA may vary to have various pulse widths such as first to $n^{th}$ pulse widths WD1 to WDn as in FIG. 11. That is, a pulse width of each of the first clock signal Gclk1 and the second clock signal Gclk2 applied to the sub-display area SA may gradually vary in a predetermined section on the basis of a length difference (a luminance difference caused by a shape of an opening) between gate lines. As described above, when a pulse width of the first clock signal Gclk1 and a pulse width of the second clock signal Gclk2 applied to the sub-display area SA vary progressively, a problem where a luminance deviation occurs in a line form because a pulse width is instantaneously changed may be solved.

Furthermore, a maximum pulse width WDn of each of the first clock signal Gclk1 and the second clock signal Gclk2 applied to the sub-display area SA may be narrower than or equal to the pulse width WDM of each of the first clock signal Gclk1 and the second clock signal Gclk2 applied to the main display area MA. However, this should be construed as one aspect.

Hereinafter, when an opening CH has a circular shape, an example of a pulse width of each of the first clock signal Gclk1 and the second clock signal Gclk2 applied to the sub-display area SA will be described.

As illustrated in FIG. 10, when an opening CH has a circular shape, a region may be divided into a plurality of regions like an A region LA, a B region LB, a C region LC, and a D region LD, and a pulse width of each of a first clock signal Gclk1 and a second clock signal Gclk2 applied to the regions may vary.

Hereinafter, the A region LA may be defined as a left upper portion of a circular opening CH, the B region LB may be defined as a left lower portion of the circular opening CH, the C region LC may be defined as a middle-upper portion adjacent to the left upper portion, and the D region LD may be defined as a middle-lower portion adjacent to the left lower portion. Also, it may be assumed that a length relationship between one-side gate lines corresponding to the A to D regions LA to LD is "the A region LA<the B region LB<the C region LC<the D region LD".

In a case where the length relationship between the one-side gate lines corresponding to the A to D regions LA to LD is as described above, when each of the first clock signal Gclk1 and the second clock signal Gclk2 varies in pulse width and is applied, a pulse width of a gate signal Gout may vary based thereon. According to the aspect of FIG. 12, a pulse width of each of the first clock signal Gclk1 and the second clock signal Gclk2 applied to the C region LC may be narrowest, a pulse width of each of the first clock signal Gclk1 and the second clock signal Gclk2 applied to the B region LB may be widest, and a pulse width of each of the first clock signal Gclk1 and the second clock signal Gclk2 applied to the A region LA and the D region LD therebetween may progressively vary, as shown in FIG. 12.

Furthermore, a variation of a pulse width of the gate signal Gout may change a sampling time of a data voltage applied to a subpixel. For example, when a sampling time is reduced, a current may much flow because a threshold voltage of a driving transistor is not sufficiently compensated for. As described above, when a current flows more, a subpixel may realize luminance which is higher than target luminance.

Therefore, a sampling time of each of subpixels included in the sub-display area SA may be changed by at least one horizontal line units. In other words, the subpixels included in the sub-display area SA may have a data voltage charging rate which varies by at least one horizontal line units. On the other hand, sampling times of subpixels included in the main display area MA may be the same. In other words, the subpixels included in the main display area MA may have the same data voltage charging rate.

According to the present disclosure, by using such a characteristic, luminance uniformity may be realized by controlling the luminance of the sub-display area SA where luminance is reduced compared to the main display area MA.

Hereinafter, a pulse width controller for controlling a pulse width of a clock signal, a subpixel, and a shift register applicable to the present disclosure will be described in more detail.

Figure 13:
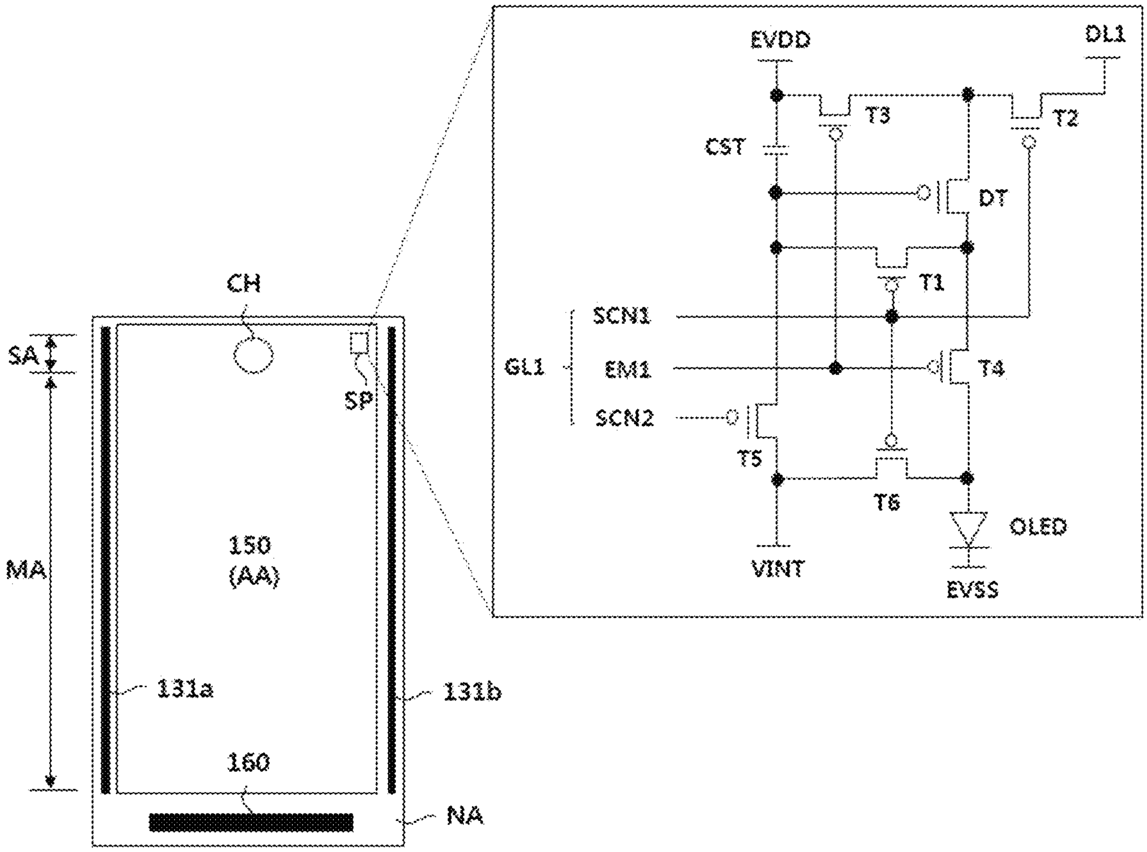
FIG. 13 is an exemplary diagram of a configuration of a subpixel applicable to a third aspect of the present disclosure.
Figure 14:
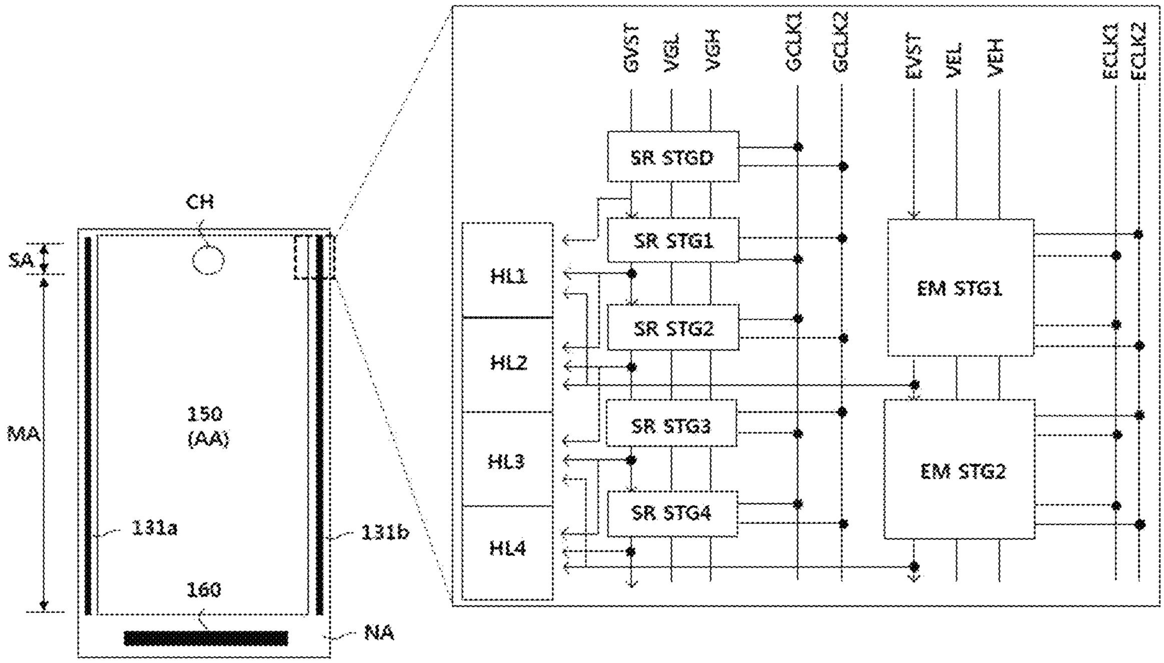
FIG. 14 is an exemplary diagram of a configuration of a shift register applicable to the third aspect of the present disclosure.
Figure 15:
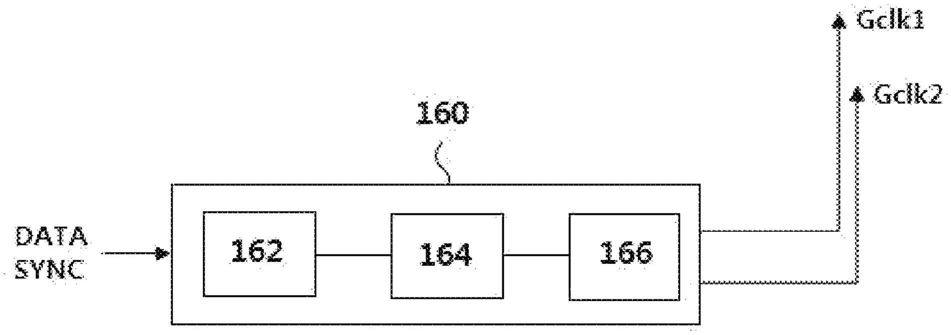
FIG. 15 is an exemplary diagram of a configuration of a pulse width controller applicable to the third aspect of the present disclosure.
Figure 16:
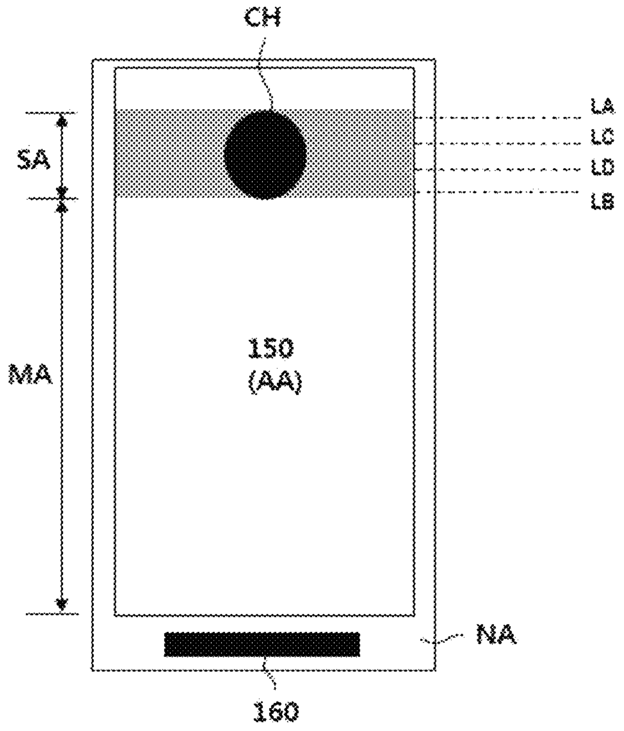
FIGS. 16 and 17 are diagrams for describing a clock signal applying method according to the third aspect of the present disclosure.
Figure 17:
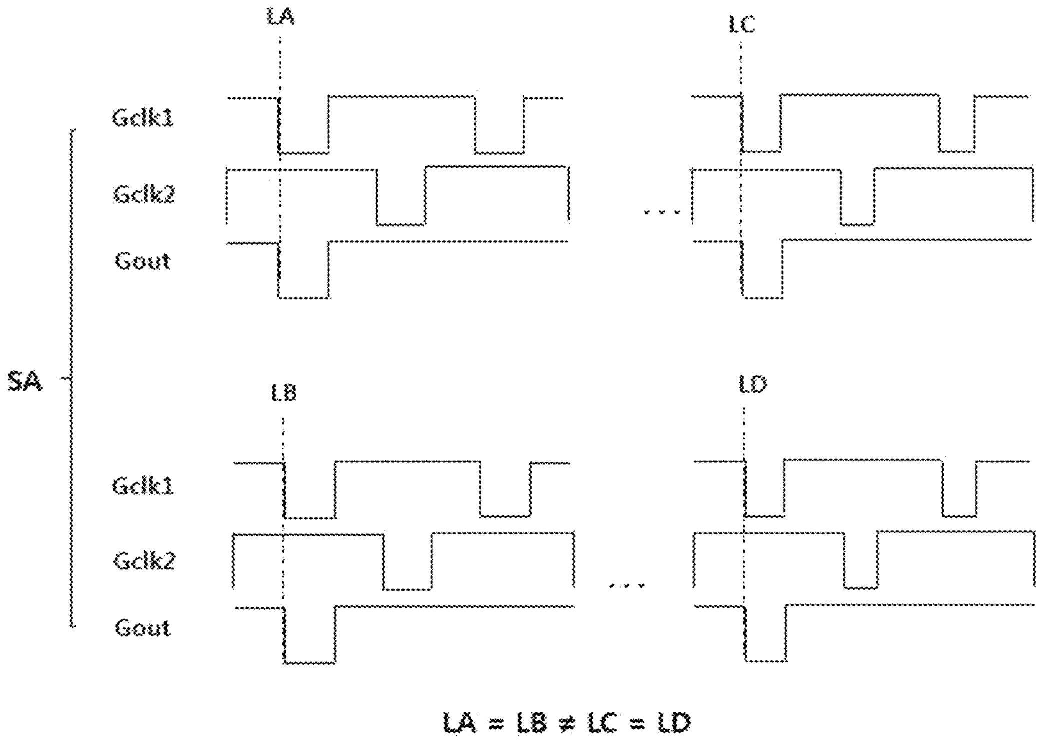

FIG. 13 is an exemplary diagram of a configuration of a subpixel applicable to a third aspect of the present disclosure, FIG. 14 is an exemplary diagram of a configuration of a shift register applicable to the third aspect of the present disclosure, FIG. 15 is an exemplary diagram of a configuration of a pulse width controller applicable to the third aspect of the present disclosure, and FIGS. 16 and 17 are diagrams for describing a clock signal applying method according to the third aspect of the present disclosure.

As illustrated in FIG. 13, the subpixel applicable to the third aspect of the present disclosure may include a first transistor T1, a second transistor T2, a third transistor T3, a fourth transistor T4, a fifth transistor T5, a sixth transistor T6, a capacitor CST, a driving transistor DT, and an organic light emitting diode OLED.

The subpixel applicable to the third aspect may be connected to a first gate line GL1 which includes a first scan line SCN1, a second scan line SCN2, and a first emission control line EM1. Hereinafter, an example will be described where the second scan line SCN2 uses a scan signal applied to a scan line of a front end (or a scan line included in a subpixel of a front end) instead of a scan line illustrated currently.

The first, second, and sixth transistors T1, T2, and T6 may be turned on in response to a first scan signal transferred through the first scan line SCN1, the fifth transistor T5 may be turned on in response to a second scan signal transferred through the second scan line SCN2, and the third and fourth transistors T3 and T4 may be turned on in response to a first emission control signal transferred through the first emission control line EM1.

The first scan signal may be applied in a sampling period for sampling a threshold voltage of the driving transistor DT and a data application period for transferring a data voltage of a first data line DL1 to a gate node of the driving transistor DT. The second scan signal may be applied in an initialization period for transferring a voltage of a voltage line VINT to the gate node of the driving transistor DT, a connection node of the capacitor CST, and an anode electrode of the organic light emitting diode OLED. The first emission control signal may be applied in an emission period for transferring a high level voltage of a first power line EVDD to a node of the driving transistor DT and transferring a driving current, generated from the driving transistor DT, to the anode electrode of the organic light emitting diode OLED.

In the subpixel described above, a driving current (Ioled current) generated from the driving transistor DT may be expressed as "Ioled current=K/2 $(V_{SG\_th1})^2$=K/2 $(VDD-(V_{data}-V_{th2})-V_{th1})^2$". In the equation, $V_{th1}$ may denote a factor representing a threshold voltage characteristic of the driving transistor DT, and $V_{th2}$ may denote a factor affecting a level of a gate voltage Vg of the driving transistor DT which is turned on for a sampling time. Here, when a sampling time is reduced, the threshold voltage of the driving transistor DT may not be sufficiently compensated for because the gate voltage Vg is low.

Therefore, when $V_{th2}<V_{th1}$ in an equation "K/2 $(VDD-(V_{data}-V_{th1})-V_{th2})^2$", a current may form a condition where a current flows more than a target value. When a current flows more, a subpixel may show luminance which is higher than target luminance. However, the subpixel described with reference to FIG. 13 should be construed as one aspect.

As illustrated in FIG. 14, a plurality of shift registers 131*a* and 131*b* applicable to the third aspect of the present disclosure may include a plurality of scan signal generating stages SR STGD and SR STG1 to SR STG4 and a plurality of emission signal generating stages EM STG1 to EM STG2, as seen through a shift register disposed in a sub-display area SA.

A configuration of a shift register (which may be called as a sub shift register) disposed in the sub-display area SA may be the same as that of a shift register (which may be called as a main shift register) disposed in a main display area MA. Each of scan signal generating stages of the shift register disposed in the sub-display area SA and scan signal generating stages of the shift register disposed in the main display area MA may operate based on an independently applied signal. That is, the shift register disposed in the sub-display area SA and the shift register disposed in the main display area MA may each be implemented as an independent type.

Furthermore, the third aspect of the present disclosure may relate to a variation of a pulse width of each of first and second clock signals (sub-clock signals) applied to a shift register disposed in the sub-display area SA, and thus, the shift register disposed in the sub-display area SA will be mainly described below.

The scan signal generating stages SR STGD and SR STG1 to SR STG4 may be connected to a first start signal line GVST, a first gate low voltage line VGL, a first gate high voltage line VGH, a first clock signal line GCLK1, and a second clock signal line GCLK2.

A dummy scan signal generating stage SR STGD may operate based on a first start signal applied through the first start signal line GVST, a first clock signal applied through the first clock signal line GCLK1, and a second clock signal applied through the second clock signal line GCLK2. The dummy scan signal generating stage SR STGD may output a dummy scan signal on the basis of a first gate low voltage applied through the first gate low voltage line VGL and a first gate high voltage applied through the first gate high voltage line VGH. A dummy scan signal may be applied to a stage which is added in a dummy form for generating a scan signal applied to a scan line of a front end (or a scan line included in a subpixel of a front end). The dummy scan signal may be applied to a first horizontal line HL1.

A first scan signal generating stage SR STG1 may operate based on a carry signal (corresponding to a start signal) output from the dummy scan signal generating state SR STGD, the first clock signal applied through the first clock signal line GCLK1, and the second clock signal applied through the second clock signal line GCLK2. The first scan signal generating stage SR STG1 may output a first scan signal on the basis of the first gate low voltage applied through the first gate low voltage line VGL and the first gate high voltage applied through the first gate high voltage line VGH. The first scan signal may be applied through a first scan line disposed in the first horizontal line HL1.

Hereinafter, configuration, connection, and operation relationships of second to fourth scan signal generating stages SR STG2 to SR STG4 may be the same as the dummy scan signal generating stage SR STGD and the first scan signal generating stage SR STG1, and thus, may be referred to.

The emission signal generating stages EM STG1 to EM STG2 may be connected to a second start signal line EVST, a second gate low voltage line VEL, a second gate high voltage line VEH, a third clock signal line ECLK1, and a fourth clock signal line ECLK2.

A first emission signal generating stage EM STG1 may operate based on a second start signal applied through the second start signal line EVST, a third clock signal applied through the third clock signal line ECLK1, and a fourth clock signal applied through the fourth clock signal line ECLK2. The first emission signal generating stage EM STG1 may output a first emission signal on the basis of a second gate low voltage applied through the second gate low voltage line VEL and a second gate high voltage applied through the second gate high voltage line VEH. The first emission signal may be applied through a first emission control line disposed in the first horizontal line HL1 and the second horizontal line HL2.

A second emission signal generating stage EM STG2 may operate based on a carry signal (corresponding to a start signal) output from the first emission control signal generating stage EM STG1, the third clock signal applied through the third clock signal line ECLK1, and the fourth clock signal applied through the fourth clock signal line ECLK2. The second emission signal generating stage EM STG2 may output a second emission signal on the basis of the second gate low voltage applied through the second gate low voltage line VEL and the second gate high voltage applied through the second gate high voltage line VEH. The second emission signal may be applied to a third horizontal line HL3 and a fourth horizontal line HL4.

Hereinafter, configuration, connection, and operation relationships of emission signal generating stages (not shown) may be the same as the first emission signal generating stage EM STG1 and the second emission signal generating stage EM STG2, and thus, may be referred to.

As illustrated in FIG. 15, a driver 160 may include a clock signal generating unit 162, a clock signal variation unit 164, and a clock signal output unit 166. The driver 160 may include various elements as well as the elements illustrated in FIG. 15, but a state where the various elements are omitted may be referred to.

The clock signal generating unit 162 may generate clock signals for driving a shift register provided in a display panel 150, on the basis of a data signal DATA and a synchronization signal SYNC input thereto.

The clock signal variation unit 164 may vary first and second clock signals Gclk1 and Gclk2 (sub-clock signals) of clock signals transferred from the clock signal generating unit 162, on the basis of a position and a time at which a clock signal is applied to the shift register provided in a sub-display area SA. The clock signal variation unit 164 may vary the first and second clock signals Gclk1 and Gclk2 transferred from the clock signal generating unit 162, on the basis of the data signal DATA and the synchronization signal SYNC output from the outside. The clock signal variation unit 164 may vary the first and second clock signals Gclk1 and Gclk2 on the basis of data (including data corresponding to a shape of an opening) of a lookup table provided through an experiment so that an output timing and a line load are considered. The clock signal variation unit 164 may vary the first and second clock signals Gclk1 and Gclk2 on the basis of a feedback line sensor installed at a start point and an end point of an opening CH of the display panel 150.

The clock signal output unit 166 may output the clock signals (main clock signals which are not varied) transferred from the clock signal generating unit 162 and may output the first and second clock signals Gclk1 and Gclk2 (varied sub-clock signals) transferred from the clock signal variation unit 164. That is, the driver 160 may separate a sub-clock signal for controlling the sub-display area SA and a main clock signal for controlling the main display area MA and vary a pulse width of the sub-clock signal. The clock signals transferred from the clock signal generating unit 162 may be applied to the main display area MA, and the first and second clock signals Gclk1 and Gclk2 transferred from the clock signal variation unit 164 may be applied to the sub-display area SA.

As illustrated in FIG. 16, an A region LA may be defined as an uppermost portion of a circular opening CH, a B region LB may be defined as a lowermost portion of the circular opening CH, a C region LC may be defined as a middle-upper portion adjacent to the uppermost portion, and a D region LD may be defined as a middle-lower portion adjacent to the lowermost portion. Also, it may be assumed that a length relationship between one-side gate lines corresponding to the A to D regions LA to LD is "the A region LA=the B region LB the C region LC=the D region LD".

In a case where the length relationship between the one-side gate lines corresponding to the A to D regions LA to LD is as described above, when each of the first clock signal Gclk1 and the second clock signal Gclk2 varies in pulse width and is applied as in FIG. 17, a pulse width of a gate signal Gout may vary based thereon. In other words, a pulse width of a scan signal applied to subpixels disposed in the sub-display area SA may vary based on the pulse width of the sub-clock signal.

According to the aspect of FIG. 17, pulse widths of the first clock signal Gclk1 and the second clock signal Gclk2 applied to the A region LA and the B region LB may be equal, and pulse widths of the first clock signal Gclk1 and the second clock signal Gclk2 applied to the C region LC and the D region LD may be equal. However, the pulse widths of the first clock signal Gclk1 and the second clock signal Gclk2 applied to the A region LA and the B region LB may be wider than the pulse widths of the first clock signal Gclk1 and the second clock signal Gclk2 applied to the C region LC and the D region LD.

Furthermore, because not only the A to D regions LA to LD are provided in the sub-display area SA, pulse widths of the first clock signal Gclk1 and the second clock signal Gclk2 may gradually vary between two reference regions (between LA and LB and between LC and LD) described above in other regions.

Moreover, as described above, a method of varying a pulse width of a clock signal may be performed by performing additional compensation on an apparatus which is not compensated for by a camera compensation method, or in a case where data of region-based characteristic of a display panel is retained, camera compensation may be omitted.

Hereinabove, according to the aspects of the present disclosure, a problem of luminance non-uniformity caused by a load difference of a gate driver may be solved in forming an opening (a hole or a notch) of a display area of a display panel. Also, in the present disclosure, a clock signal applied to the gate driver may vary based on a shape of the opening, thereby compensating for a horizontal luminance difference in the display area of the display panel.

The effects according to the present disclosure are not limited to the above examples, and other various effects may be included in the specification.

While the present disclosure has been particularly shown and described with reference to exemplary aspects thereof, it will be understood by those of ordinary skill in the art that various changes in form and details may be made therein without departing from the spirit and scope of the present disclosure as defined by the following claims.

What is claimed is:

1. A display apparatus comprising:

a display panel including a sub-display area including an opening and a main display area with no opening;

a gate driver supplying a gate signal to the display panel; and a driver controlling the gate driver, wherein the driver separates a sub-clock signal for controlling the sub-display area and a main clock signal for controlling the main display area and varies a pulse width of the sub-clock signal, and wherein the driver includes:

a clock signal generating unit for generating the sub-clock signal for controlling the sub-display area and the main clock signal for controlling the main display area;

a clock signal variation unit for varying the pulse width of the sub-clock signal on the basis of a position and a time at which the sub-clock signal is applied to the shift register provided in a sub-display area; and a clock signal output unit for outputting the main clock signal, which is not varied, transferred from the clock signal generating unit and the sub-clock signal, which is varied, transferred from the clock signal variation unit.

2. The display apparatus of claim 1, wherein the driver varies the pulse width of the sub-clock signal, for compensating for a luminance difference caused by a shape of the opening.

3. The display apparatus of claim 2, wherein the driver varies gradually the pulse width of the sub-clock signal in a predetermined section based on the shape of the opening.

4. The display apparatus of claim 3, wherein the sub-display area includes an A region defined as a left upper portion of the opening, a B region defined as a left lower portion of the opening, a C region defined as a middle-upper portion adjacent to the left upper portion, and a D region defined as a middle-lower portion adjacent to the left lower portion, and wherein the pulse width of the sub-clock signal applied to the C region is narrowest, the pulse width of the sub-clock signal applied to the B region is widest, and the pulse width of the sub-clock signal applied to the A region and the D region therebetween progressively varies.

5. The display apparatus of claim 3, wherein the sub-display area includes an A region defined as an uppermost portion of the opening, a B region defined as a lowermost portion of the opening, a C region defined as a middle-upper portion adjacent to the uppermost portion, and a D region defined as a middle-lower portion adjacent to the lowermost portion, and wherein the pulse width of the sub-clock signal applied to the A region and the B region is equal, and the pulse width of the sub-clock signal applied to the C region and the D region is equal, and the pulse width of the sub-clock signal applied to the A region and the B region is wider than the pulse width of the sub-clock signal applied to the C region and the D region.

6. The display apparatus of claim 1, wherein a sampling time of each of subpixels disposed in the sub-display area varies by at least one horizontal line units based on a variation of the pulse width of the sub-clock signal.

7. The display apparatus of claim 6, wherein a sampling time of each of subpixels included in the main display area is the same.

8. The display apparatus of claim 1, wherein a pulse width of a scan signal applied to subpixels disposed in the sub-display area varies based on the pulse width of the sub-clock signal.

9. The display apparatus of claim 1, wherein the pulse width of the sub-clock signal is narrower than a pulse width of the main clock signal.

10. The display apparatus of claim 1, wherein the driver does not vary a pulse width of the main clock signal for controlling the main display area.

11. The display apparatus of claim 1, wherein the clock signal variation unit varies the pulse width of the sub-clock signal based on a feedback line sensor installed at a start point and an end point of the opening of the display panel.

12. A display apparatus comprising:

a display panel including a sub-display area including an opening and a main display area with no opening;

a gate driver supplying a gate signal to the display panel; and a driver controlling the gate driver, wherein a sampling time of each of subpixels disposed in the sub-display area varies by at least one horizontal line units, and wherein the driver includes:

a clock signal generating unit for generating the sub-clock signal for controlling the sub-display area and the main clock signal for controlling the main display area;

a clock signal variation unit for varying the pulse width of the sub-clock signal on the basis of a position and a time at which the sub-clock signal is applied to the shift register provided in a sub-display area; and a clock signal output unit for outputting the main clock signal, which is not varied, transferred from the clock signal generating unit and the sub-clock signal, which is varied, transferred from the clock signal variation unit.

13. The display apparatus of claim 12, wherein the driver separates a sub-clock signal for controlling the sub-display area and a main clock signal for controlling the main display area and varies a pulse width of the sub-clock signal, so that the sampling time of each of the subpixels disposed in the sub-display area varies by at least one horizontal line units.

14. The display apparatus of claim 13, wherein the driver varies gradually the pulse width of the sub-clock signal in a predetermined section based on a shape of the opening.

15. The display apparatus of claim 13, wherein the driver does not vary a pulse width of the main clock signal for controlling the main display area.

16. The display apparatus of claim 12, wherein the subpixels disposed in the sub-display area have a data voltage charging rate which varies by at least one horizontal line units.

17. The display apparatus of claim 12, wherein the clock signal variation unit varies the pulse width of the sub-clock signal based on a feedback line sensor installed at a start point and an end point of the opening of the display panel.

18. A driving method of a display apparatus including a display panel including a sub-display area including an opening and a main display area with no opening, a gate driver supplying a gate signal to the display panel, and a driver controlling the gate driver, the driving method comprising:

applying a sub-clock signal for controlling the sub-display area to a sub shift register;

applying a main clock signal for controlling the main display area to a main shift register; and applying a scan signal, generated based on the sub-clock signal and the main clock signal, to a display panel and sampling a data voltage, wherein the applying of the sub-clock signal to the sub shift register comprises gradually varying the pulse width of the sub-clock signal in a predetermined section based on a shape of the opening.

* * * * *